United States Patent [19]

Liet et al.

[11] 4,341,354
[45] Jul. 27, 1982

[54] DEVICE FOR CUTTING OUT AND TRANSPORTING A SILAGE BLOCK

[75] Inventors: Fredericus Liet; Cornelis H. Liet, both of Losser, Netherlands

[73] Assignee: Triolet Silo Europe BV, Losser, Netherlands

[21] Appl. No.: 147,086

[22] Filed: May 7, 1980

[30] Foreign Application Priority Data

May 18, 1979 [NL] Netherlands .................. 7903956

[51] Int. Cl.³ ............................................. A01F 29/00
[52] U.S. Cl. .................................. 241/101.7; 83/701;
83/801; 83/928; 294/67 AB; 414/622; 414/721
[58] Field of Search ................. 83/701, 928, 758, 795,
83/801, 647; 414/132, 622, 721; 294/67 AB;
241/101 A, 101.7, 283

[56] References Cited

U.S. PATENT DOCUMENTS

| | | | |
|---|---|---|---|
| 2,828,039 | 3/1958 | Puim .................................. | 414/622 |
| 3,409,157 | 11/1968 | Lull .................................. | 414/622 X |
| 3,884,377 | 5/1975 | Holdeman ......................... | 414/721 X |
| 3,967,742 | 7/1976 | Meinert ............................. | 414/721 X |

FOREIGN PATENT DOCUMENTS 2408822  9/1974  Fed. Rep. of Germany ... 241/101.7

*Primary Examiner*—James M. Meister
*Attorney, Agent, or Firm*—Holman & Stern

[57] ABSTRACT

A device for cutting out and transporting a silage block, comprising a main frame which may be connected to a tractor and which comprises an at least approximately horizontal cross-beam, which carries a plurality of parallel tines and to which an upstanding main frame part is connected, which supports near its upper end an at least approximately horizontal frame member, along which a drive housing may be reciprocated. A sawing or cutting means is guided in this drive housing for upward and downward movement. The upstanding main frame part further supports a pressure frame underneath said frame member which extends near the track of the sawing or cutting means and which may be displaced by actuating means. The pressure frame comprises a plurality of pressure frame parts which are displaceable with respect to each other.

31 Claims, 9 Drawing Figures

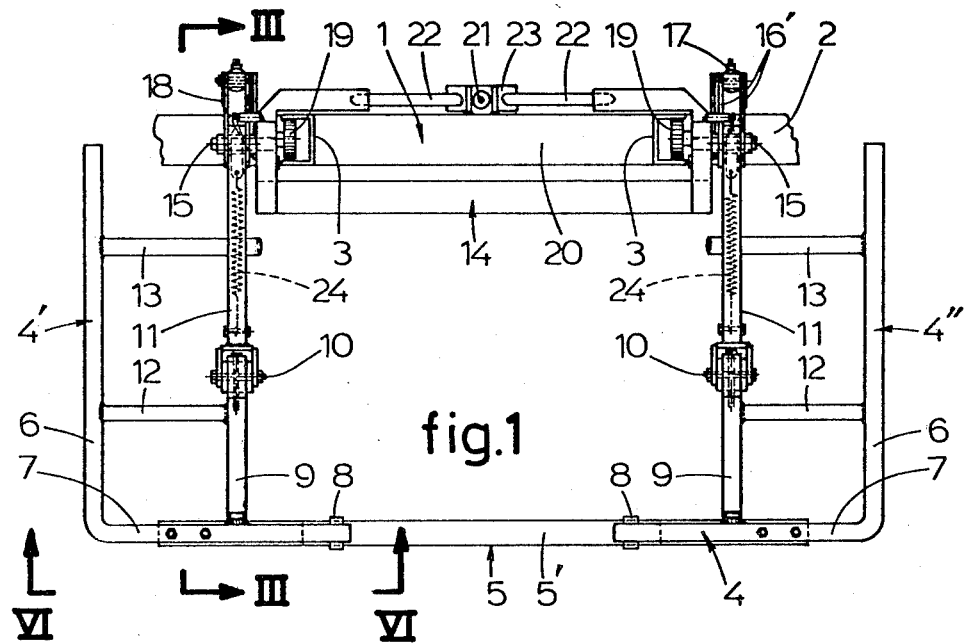
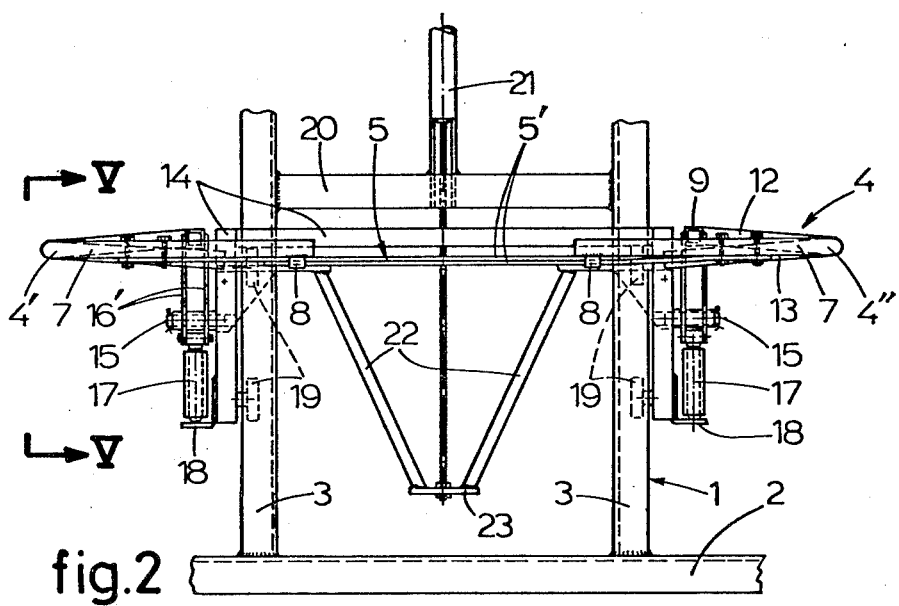

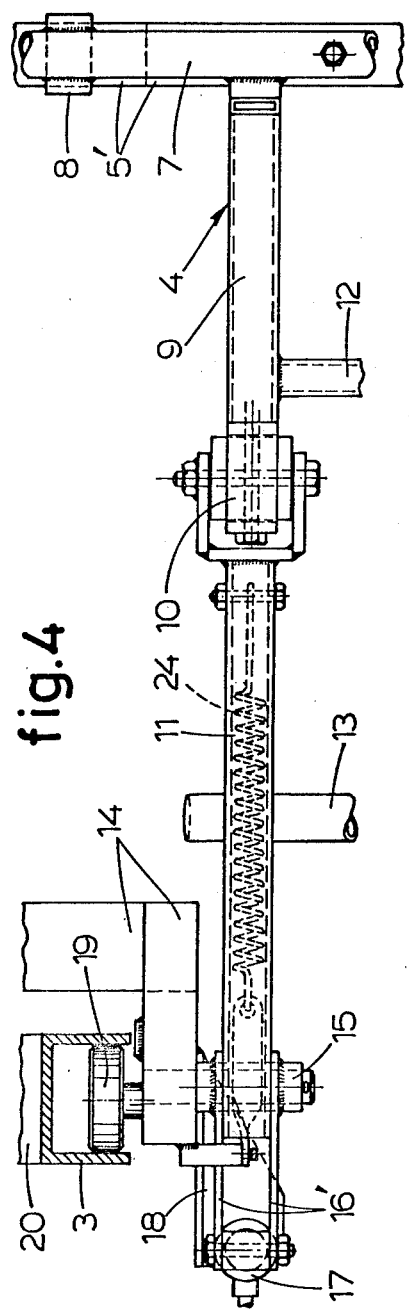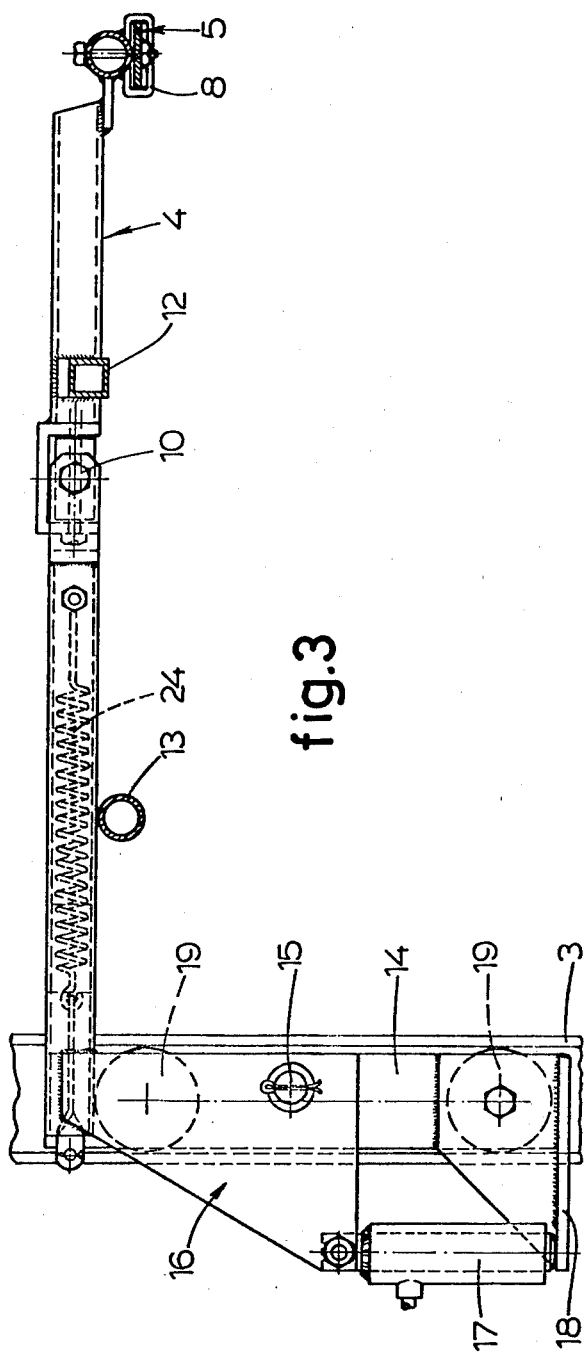

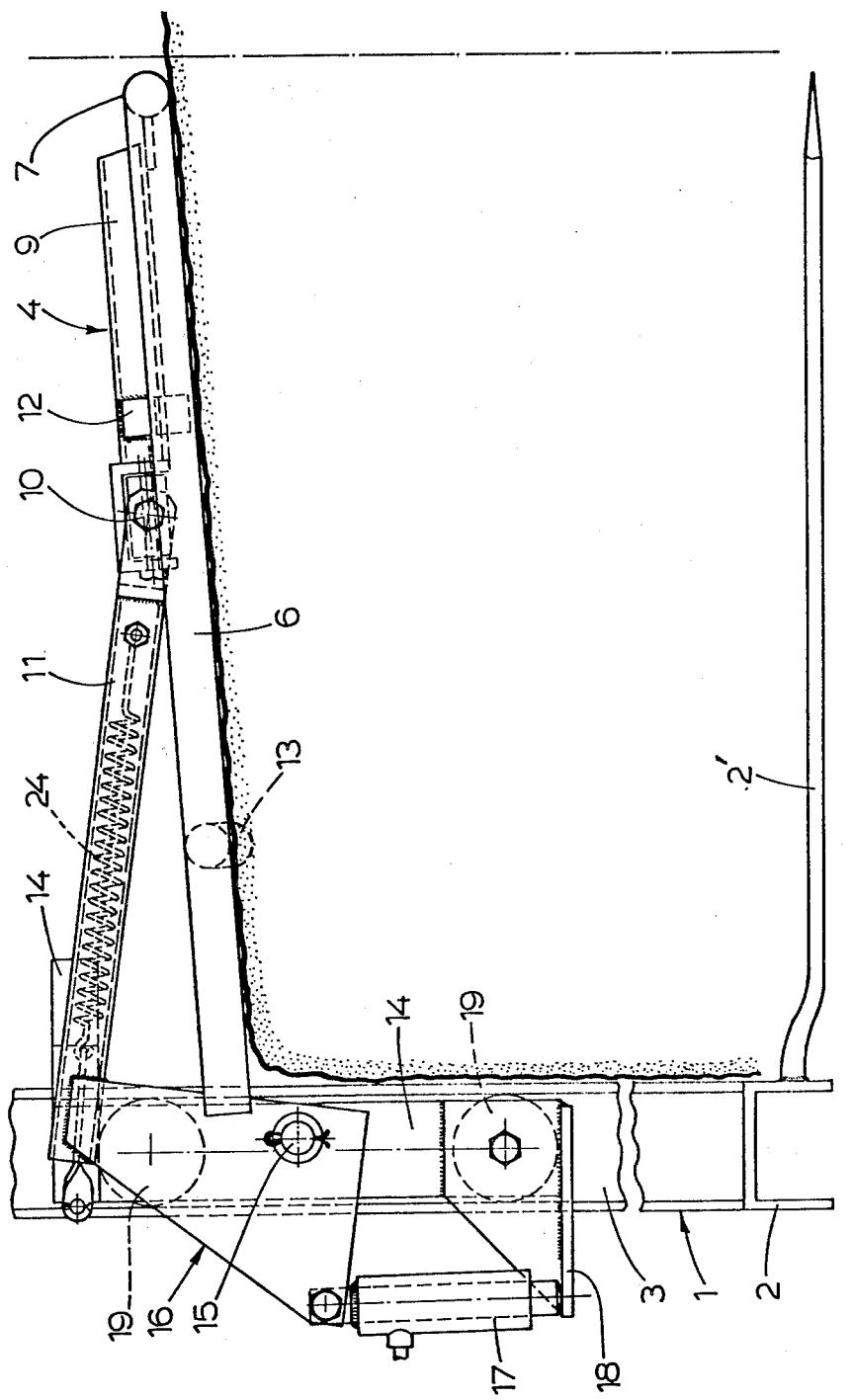

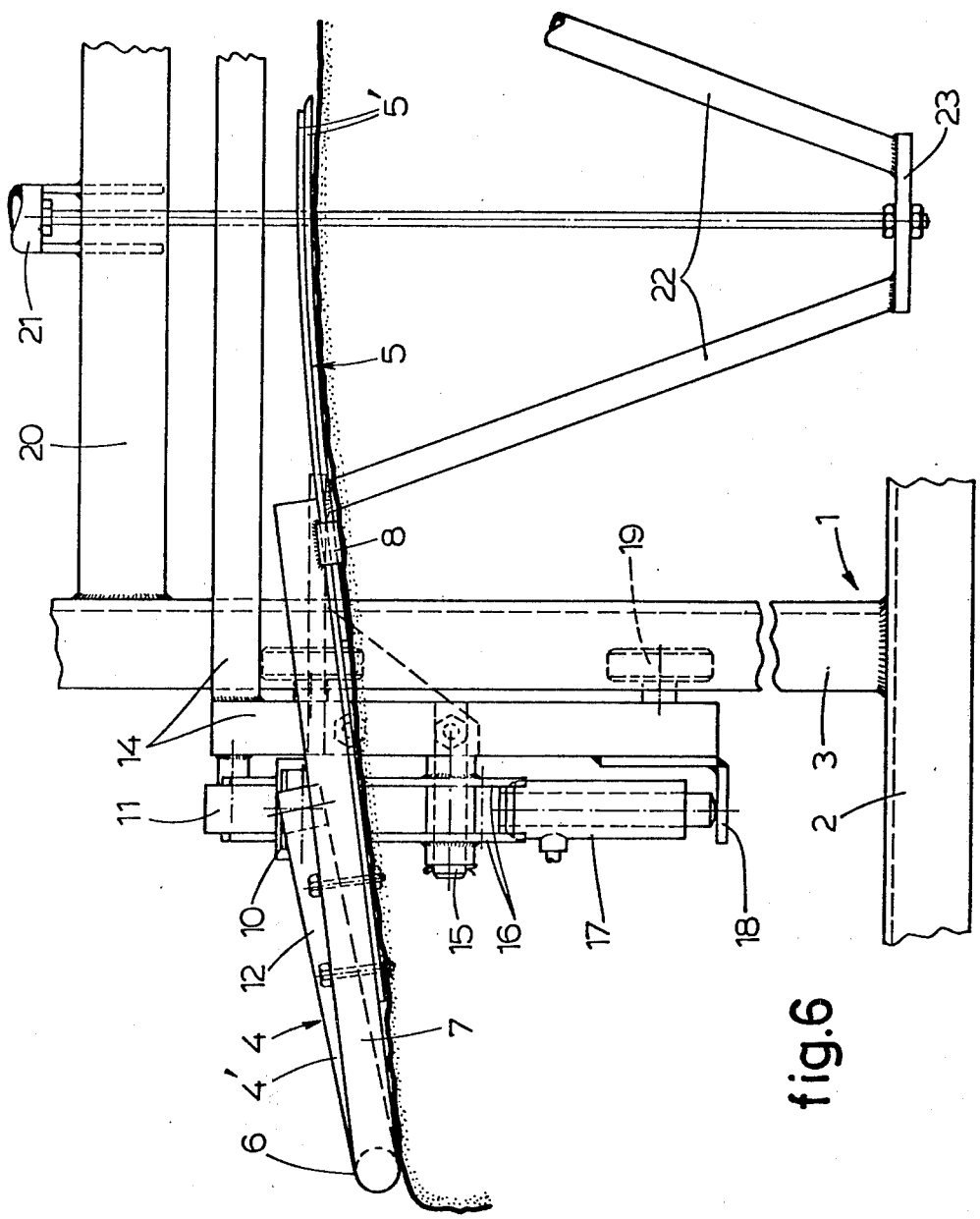

DEVICE FOR CUTTING OUT AND TRANSPORTING A SILAGE BLOCK

BACKGROUND OF THE INVENTION

The invention relates to a device for cutting out and transporting a silage block, comprising a main frame which may be connected to a tractor and which comprises an at least approximately horizontal cross-beam, which carries a plurality of parallel tines and to which an upstanding main frame part is connected, which supports near its upper end an at least approximately horizontal frame member, along which a drive housing may be reciprocated, a sawing or cutting means being guided in this drive housing for upward and downward movement, the upstanding main frame part further supporting a pressure frame underneath said frame member which extends near the track of the sawing or cutting means and which may be displaced by actuating means.

In prior embodiments of such a device the pressure frame is of rigid construction and extends in an at least approximately horizontal plane. This pressure frame may be displaced by the actuating means upwardly and downwardly with respect to the upstanding main frame part. As the upper surface of the silage is rather irregular in general and departs considerably from a flat plane, the pressure frame in the operating position engages the upper surface of the silage in a few places only. This results in that during the operation of the sawing or cutting means silage material may be freely taken along upwardly by the sawing or cutting means at certain parts of its track, thus causing the surface of the silage to crumble. Further, when cut out silage blocks are transported by the device the pressure frame will again only engage certain places of the upper surface of the silage, so that the danger exists that the silage blocks as a whole may get detached from the device, or that these silage blocks may lose silage material due to crumbling.

SUMMARY OF THE INVENTION

It is an object of the present invention to improve a device as mentioned hereinbefore in such manner that the above disadvantages are effectively removed.

For this purpose the device according to the invention is characterized in that the pressure frame is composed of a plurality of pressure frame parts, which are displaceable with respect to each other.

According to the invention no rigid pressure frame is used any more, as the pressure frame is subdivided into a plurality of pressure frame parts, which are adjustable with respect to each other. Thus, the pressure frame can adapt itself much better to the upper surface of the silage.

This subdivided pressure frame prevents in a very effective manner the sawing or cutting means from taking along silage material upwardly, as in operation one of the pressure frame parts will always exert pressure on the silage in the immediate vicinity of this sawing or cutting means. Further, during the transport of cut out silage blocks a loosening or crumbling of the silage blocks is prevented by the subdivided pressure frame.

BRIEF DESCRIPTION OF THE DRAWINGS

FIG. 1 is a top plan view of a pressure frame according to the invention, mounted on a device for cutting out and transporting a silage block, which device is only partly shown.

FIG. 2 is a elevation front view of the arrangement according to FIG. 1.

FIG. 3 is a section along the plane III—III in FIG. 1 on a larger scale.

FIG. 4 is a top view of the arrangement according to FIG. 3.

FIG. 5 is a view in the direction of the arrows V—V in FIG. 2 on a larger scale.

FIG. 6 is a view in the direction of the arrows VI—VI in FIG. 1 on a larger scale.

DETAILED DESCRIPTION

Figure 7:
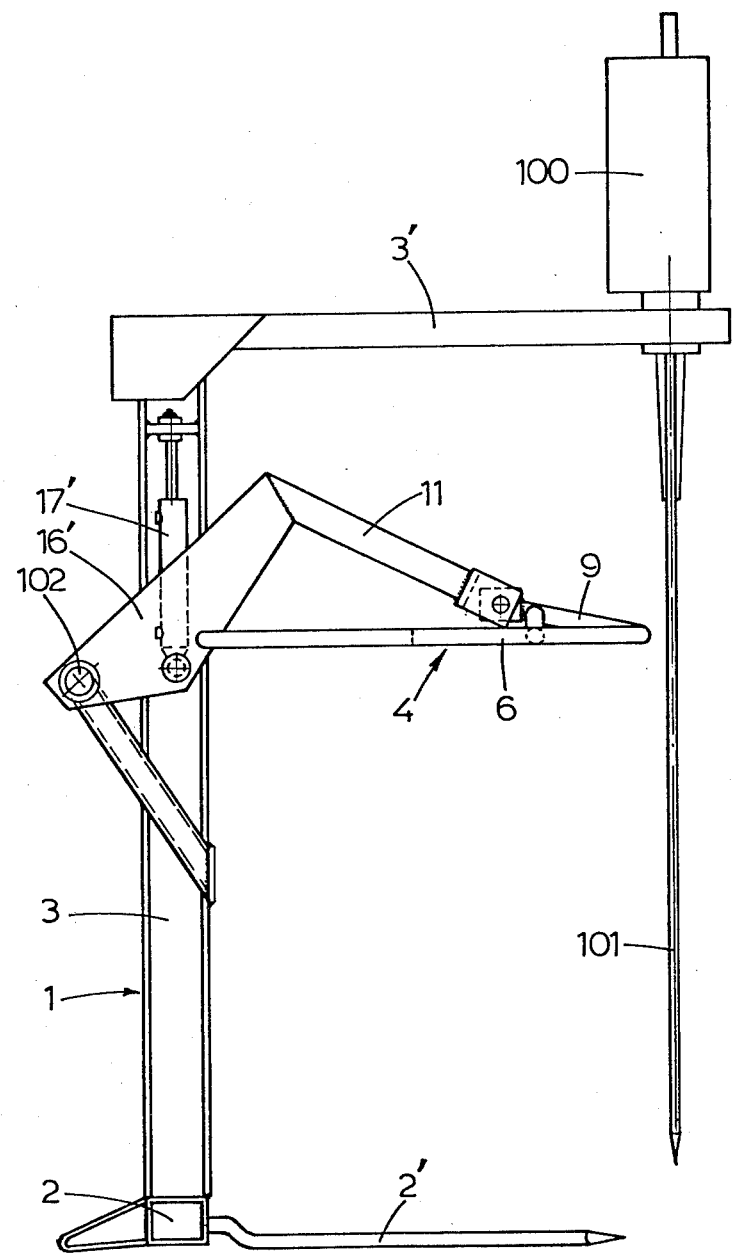
FIG. 7 is a side view of a device for cutting out and transporting a silage block, wherein a modified embodiment of the actuating means of the pressure frame is applied.

FIGS. 1-6 show a pressure frame according to the invention, which is mounted on a device for cutting out and transporting a silage block, which device is only partly shown and may be of customary construction.

This device comprises a main frame 1 (see in particular FIGS. 7 and 8), which may be connected to a tractor. The main frame 1 comprises an at least approximately horizontal cross-beam 2, which carries a plurality of parallel tines 2' (FIG. 5), while an upstanding main frame part 3 connects to the cross-beam 2. This upstanding main frame part 3 supports an at least approximately horizontal U-shaped frame member 3' adjacent its upper end, while a drive housing 100 is guided by this U-shaped frame member 3' for reciprocal movement along this horizontal frame member 3'. In this drive housing 100 a sawing or cutting means 101 is guided for reciprocal downward and upward movement.

The upstanding main frame part 3 further supports a pressure frame underneath this horizontal frame member 3', which pressure frame is indicated as a whole with the reference number 4 and extends inwardly of the track of the sawing or cutting means 101.

According to the invention the pressure frame 4 is composed of a plurality of pressure frame parts—in the embodiment shown of two parts 4' and 4"—which may be adjusted with respect to each other by an actuating means which will be further elucidated hereinafter.

In the embodiment shown in FIGS. 1-6 these pressure frame parts 4' and 4" are symmetrically arranged relative to each other as is shown in particular in FIG. 1 and are connected to each other at their ends, which are remote from the upstanding main frame part 3 by means of an intermediate part 5.

In the embodiment according to FIGS. 1-6 this intermediate part 5 consists of two elastically deformable strips 5' made of spring steel. In their unloaded rest position these strips 5' extend approximately horizontally.

Each pressure frame part 4', 4" comprises a long outer leg 6. At the end remote from the upstanding main frame part 3 this outer leg 6 carries a much shorter end arm 7 extending in the lateral direction. These end arms 7 of the two pressure frame parts 4' and 4" face each other and are interconnected by means of the strips 5'.

One strip 5' is fixed with one end to the end arm 7 of the pressure frame part 4', while its other end is slidably guided with respect to the end arm 7 of the pressure frame part 4" by means of a clip 8. One end of the other strip 5' is fixed to the end arm 7 of the pressure frame part 4", while its other end is slidably guided with respect to the end arm 7 of the pressure frame part 4' by means of a clip 8.

As an alternative it is also possible to pivotally connect one or more elastically deformable strips near their ends to the end arms 7 of the pressure frame parts 4', 4".

The end arm 7 of each of the two pressure frame parts 4', 4" further supports a short leg 9, which extends approximately perpendicular to the end arm 7. A universal coupling 10 connects the end of the leg 9 with an actuating arm 11, which extends in a plane that is perpendicular to the cross-beam 2 and which is coupled to the actuating means in a manner still to be described.

The outer leg 6 of each of the pressure frame parts 4', 4" carries a cross-arm 12 for reinforcement purposes. This cross-arm 12 is welded to the leg 9 at a short distance from the end thereof, to which the universal coupling 10 is connected.

The outer leg 6 of each of the two pressure frame parts 4', 4" supports a further cross-arm 13, which passes underneath the actuating arm 11.

As shown in FIG. 5, the actuating arm 11 is downwardly inclined in the direction towards the universal coupling 10, so that the actuating arm 11 itself remains free from the upper surface of the silage.

The outer leg 6 of each of the two pressure frame parts 4', 4" extends at least approximately perpendicular to the cross-beam 2 and is further provided with a free end remote from the end arm 7.

In the embodiment according to FIGS. 1-6 a carriage 14 is guided along the upstanding main frame part 3, whilst the actuating arm 11 of each of the two pressure frame parts 4', 4" is welded to a pivot arm 16, which is pivotally supported at 15 by the carriage 14 and which consists of two interconnected plates 16' extending at a distance from each other.

On both sides a hydraulically operated cylinder-piston assembly 17 is pivotally connected to the pivot arm 16 and further engages a bracket 18 which is supported by the carriage 14.

As shown in FIG. 1 the upstanding main frame part 3 comprises two upstanding U-sections, in which rollers 19, which are journalled in side plates of the carriage 14, may be displaced upwardly and downwardly.

Further, the main frame 1 carries a horizontal beam 20, which centrally supports a hydraulically operated cylinder-piston assembly 21, which engages the carriage 14 and displaces this carriage together with the pressure frame 4 upwardly and downwardly. For this purpose the carriage 14 comprises two downwardly converging rods 22, which extend downwardly obliquely and which are connected at their lower side with an actuating plate 23, which is connected to the piston rod of the cylinder-piston assembly 21.

When the pressure frame 4 has been moved downwardly by the cylinder-piston assembly 21, so that the pressure frame 4 has come into contact with the silage, the two pressure frame parts 4' and 4" may be pivoted with respect to each other by means of the cylinder-piston assemblies 17 via the pivot arms 16 and the actuating arms 11 connected thereto, in order to get a better engagement with the upper surface of the silage and to obtain an effective pressure action of the pressure frame parts 4', 4" on the silage. The universal couplings 10 allow for each required position of the outer legs 6 together with the arms 7, 12 and 13 connected thereto.

The strips 5' are also of the greatest importance for the free movement of the pressure frame parts 4' and 4" with respect to each other. These strips 5' cannot only obtain each desired bent or twisted shape, but also allow a considerable change in the distance between the ends of the end arms 7 due to the above described possibility to slide with one of their ends. In this manner it is effectively attained that the pressure frame parts 4' and 4", as well as the lower strip 5' are in pressing contact with the upper surface of the silage over large areas.

When the pressure frame 4 has to be displaced to its position of rest the cylinder-piston assembly 21 is actuated, so that its piston rod is moved upwardly. Return springs 24 engage the actuating arms 11 in the vicinity of the universal couplings 10, while their other end is connected with the carriage 14. These return springs 24 have the object to return the actuating arms 11 and the cylinder-piston assemblies 17 to their initial position, wherein the cross-arms 13 of the pressure frame parts 4', 4" come to rest against the lower side of the actuating arms 11.

In the embodiment shown in FIGS. 1-6 three cylinder-piston assemblies are used, viz. the cylinder-piston assembly 21 for the displacement of the carriage 14 and two cylinder-piston assemblies 17 for the displacement of the two actuating arms 11 of the pressure frame parts 4' and 4".

The cylinder-piston assembly 21 together with the two cylinder-piston assemblies 17 form the actuating means for the pressure frame 4 according to FIGS. 1-6.

In particular in a device of moderate height, it is possible to connect the pressure frame 4 directly to the upstanding main frame part 3, in such manner that the pressure frame 4 may pivot about an approximately horizontal axis as shown in FIG. 7. In this embodiment neither the carriage 14, nor the cylinder-piston assembly 21 is applied, and the actuating means consist of the two cylinder-piston assemblies 17' only. These cylinder-piston assemblies 17' may be double-acting, so that they can also be used to return the pressure frame parts 4', 4" to their approximately horizontal position of rest. It may be of advantage when the pivot arms 16' are pivotally supported by the upstanding main frame part 3 in such manner that their axis of rotation 102 is positioned at the side of the upstanding main frame part 3, which is remote from the pressure frame 4.

Figure 8:
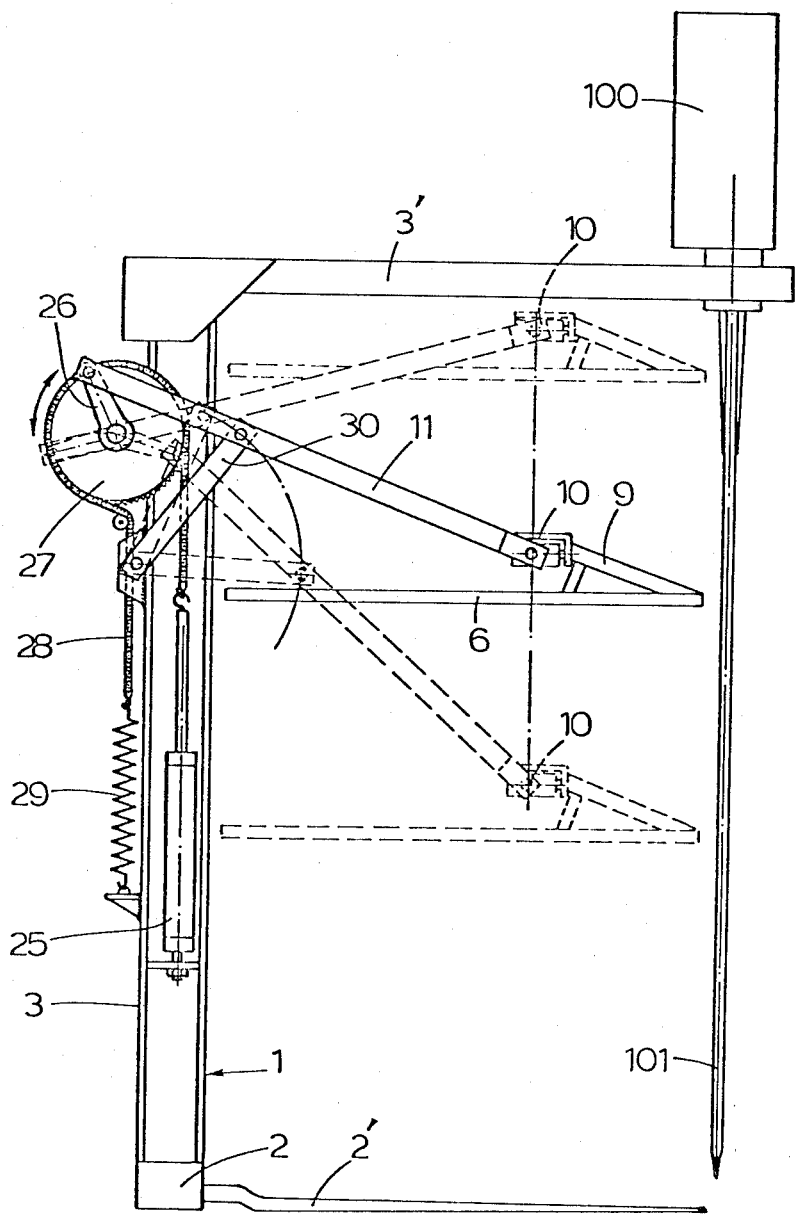
FIG. 8 is a side view of a device for cutting out and transporting a silage block, wherein another embodiment of the actuating means of the pressure frame is applied.

FIG. 8 shows a modified actuation of the pressure frame 4, wherein two cylinder-piston assemblies 25 are applied.

In this embodiment the actuating arm 11 of each of the two pressure frame parts 4', 4" is connected to a crank mechanism 26 at its side remote from the universal coupling 10. This crank mechanism 26 comprises a sprocket wheel 27 or the like, which is rotatably mounted on an at least approximately horizontal shaft, which is supported by the main frame 1 and which is parallel to the cross-beam 2. A chain 28 or the like is in engagement with the sprocket wheel 27. Each of the two chains 28 is connected at one end with a spring 29, the other end of this spring 29 engaging the main frame 1. The other end of the chains 28 can be displaced by hydraulically operated cylinder-piston assemblies 25, which are supported by the main frame 1. On both sides a carrier arm 30 is supported by the main frame 1 and is rotatable about a shaft, which is parallel to the shaft of the sprocket wheel 27. The other end of the carrier arm 30 is pivotally connected with the relative actuating arm 11. The crank mechanisms 26 and the carrier arms 30 are dimensioned in such manner that upon rotation of the sprocket wheels 27 the universal couplings 10 are displaced along approximately vertical, almost straight paths.

Figure 9:
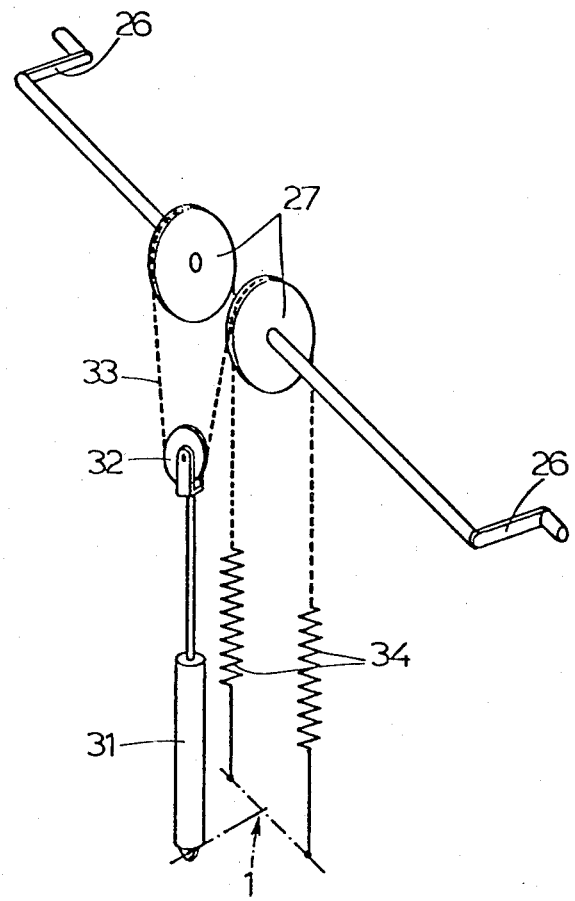
FIG. 9 is a perspective view of still another embodiment of the actuating means of the pressure frame.

Finally a further simplification is possible, a detail of which is shown in FIG. 9. In this embodiment only one cylinder-piston assembly 31 is required.

In this construction the actuating arm 11 of each of the two pressure frame parts 4', 4" is connected with a crank mechanism 26 at its end remote from the universal coupling 10. This crank mechanism 26 comprises a sprocket wheel 27 or the like, which is rotatably mounted on an at least approximately horizontal shaft, which is supported by the main frame 1 (schematically indicated by dot and dash lines) and which is parallel to the cross-beam 2.

A hydraulically operated cylinder-piston assembly 31 is centrally supported by the main frame 1 and carries a sheave 32, which extends in a plane that is at least approximately perpendicular to the planes through the sprocket wheels 27. A chain 33 or the like is passed over the one sprocket wheel 27, the sheave 32 and the other sprocket wheel 27, while both ends of the chain 33 are each connected with a spring 34, which engages the main frame 1.

In this manner it is achieved that upon an actuation of the cylinder-piston assembly 31 initially the two pressure frame parts 4', 4" are displaced together, while after one of these pressure frame parts has come into pressing engagement with the upper surface of the silage the other frame part can still be moved further.

The invention is not restricted to the embodiments shown in the drawings by way of example, which may be varied in several ways within the scope of the appended claims.

We claim:

1. In a device for cutting out and transporting a silage block, having a main frame which may be connected to a tractor and with an at least approximately horizontal cross-beam, which carries a plurality of parallel tines and to which an upstanding main frame part is connected, which supports near its upper end an at least approximately horizontal frame member, along which a cutting means may be reciprocated, the upstanding main frame part further supporting a pressure frame, the improvement comprising the pressure frame being disposed underneath said main frame member and which extends near the cutting means and which may be displaced by actuating means, said pressure frame comprising two at least approximately symmetrically arranged pressure frame parts, which are connected to each other by means of an elastically deformable intermediate part at their end which is remote from the upstanding main frame part, each pressure frame part comprising an outer leg, which carries a transversely extending end arm at its end remote from the upstanding main frame part, said end arms of the two pressure frame parts facing each other and being connected by means of the intermediate part, the end arm of each of the pressure frame parts supporting a short leg which extends at least approximately perpendicular to the end arm, said short leg being connected to an actuating arm which extends at least approximately in a plane perpendicular to the cross-beam and which is coupled with the actuating means, the end of the short leg of each pressure frame part being connected to the actuating arm by means of a universal coupling, while the actuating arm of each of the two pressure frame parts at its end remote from the universal coupling is pivotally connected to a crank mechanism, which comprises a sprocket wheel or the like which is rotatably mounted on an at least approximately horizontal shaft, which is supported by the main frame and which is parallel to the cross-beam, a chain or the like being in engagement with the sprocket wheel, which chain is connected with the end of a spring which engages the main frame, while the other end of the chain is displaceable by means of a cylinder-piston assembly which is supported by the main frame, a carrier arm being rotatably supported by the main frame about a shaft which extends parallel to the shaft of the sprocket wheel and being pivotally connected with the actuating arm, the crank mechanism and this carrier arm for each of the two pressure frame parts being dimensioned in such manner, that upon rotation of the sprocket wheel the universal coupling is displaced along an at least approximately vertical, almost straight path.

2. In a device for cutting out and transporting a silage block having a main frame which may be connected to a tractor and which comprises an at least approximately horizontal cross-beam, which carries a plurality of parallel tines and to which an upstanding main frame part is connected, which supports near its upper end an at least approximately horizontal frame member, along which a cutting means may be reciprocated, the upstanding main frame part further supporting a pressure frame underneath said frame member which extends near the cutting means and which may be displaced by actuating means, the improvement in a pressure frame comprising two at least approximately symmetrically arranged pressure frame parts, which are connected to each other by means of an elastically deformable intermediate part at their end which is remote from the upstanding main frame part, each pressure frame part comprising an outer leg, which carries a transversely extending end arm at its end remote from the upstanding main frame part, said end arms of the two pressure frame parts facing each other and being connected by means of the intermediate part, the end arm of each of the pressure frame parts supporting a short leg which extends at least approximately perpendicular to the end arm, said short leg being connected to an actuating arm which extends at least approximately in a plane perpendicular to the cross-beam and which is coupled with the actuating means, the end of the short leg of each pressure frame part being connected to the actuating arm by means of a universal coupling, while the actuating arm of each of the two pressure frame parts at its side remote from the universal coupling is pivotally connected to a crank mechanism, which comprises a sprocket wheel or the like which is rotatable about an at least approximately horizontal shaft, which is supported by the main frame and which is parallel to the cross-beam, a cylinder-piston assembly supported by the main frame, a sheave mounted on said cylinder piston means, said sheave extending in a plane that is at least approximately perpendicular to the planes through the sprocket wheels, a chain or the like being passed over the one sprocket wheel, the sheave and the other sprocket wheel, the ends of the chain being each connected to a spring which engages the main frame.

3. In a device for cutting out and transporting a silage block of the type having an upstanding main frame which is adapted to be connected to a tractor and which is provided with an at least approximately horizontal cross-beam at the lower end thereof to which a plurality of parallel tines are connected to extend substantially perpendicular thereto, an at least approximately horizontal cutting means support frame supported near the upper end of the main frame along which a cutting means is adapted to be reciprocated, and a pressure frame supported on the main frame, the improvement in a pressure frame comprising pressure frame support means adapted to be supported by the upstanding main frame underneath said cutting means support frame, a pressure frame supported by said support means having a shape so as to extend near the path of travel of the cutting means and comprising two at least approximately symmetrically arranged pressure frame parts which are displaceable with respect to each other, an actuating means operably connected to said two pressure frame parts to displace said pressure frame parts, and an elastically deformable intermediate part at the ends of said pressure frame parts, which are remote from said support connecting said pressure frame parts to each other to facilitate relative displacement of said pressure frame parts.

4. Device according to claim 3, wherein the elastically deformable intermediate part comprises one or more strip members made of spring steel or the like material, which strips in their unloaded rest position extend at least mainly horizontally.

5. Device according to claim 4, wherein each pressure frame part comprises an outer leg which carries a transversely extending end arm at its end remote from said support means, said end arms of the two pressure frame parts facing each other and being connected by means of said intermediate part.

6. Device according to claim 5, wherein the end arm of each of the pressure frame parts supports a short leg which extends at least approximately perpendicular to the end arm, said short leg being connected to an actuating arm which extends at least approximately in a plane perpendicular to said end arm and which is connected to said pressure frame support means and coupled with the actuating means.

7. Device according to claim 6, wherein the end of the short leg of each pressure frame part is connected to the actuating arm by means of a universal coupling.

8. Device according to claim 7, wherein the outer leg of each of the pressure frame parts carries a first cross-arm, which is connected to the short leg and a second cross-arm, which passes underneath the respective actuating arm.

9. A pressure frame according to claim 5, wherein each pressure frame part is connected to an actuating arm by means of a universal coupling, said actuating arm being connected to said support means and coupled with the actuating means.

10. A pressure frame according to claim 9, wherein the actuating arm of each of the two pressure frame parts is fixedly connected to a pivot arm which is pivotally supported by the support means and which is pivotally connected to said actuating means.

11. Device according to claim 10, wherein each pivot arm is pivotally supported by the upstanding main frame part.

12. Device according to claim 11, wherein the pivotal axis of each pivot arm is positioned at the side of the upstanding main frame part which is remote from the pressure frame.

13. Device according to claim 10, wherein a carriage is guided along the upstanding main frame part, which carriage may be displaced upwardly and downwardly by the actuating means, the pivot arms being pivotally supported by the carriage.

14. Device according to claim 13, wherein a return spring engages each actuating arm in the vicinity of the universal coupling, the other end of this return spring being connected with the carriage.

15. Device according to claim 13, wherein the upstanding main frame part comprises two U-sections wherein rollers are upwardly and downwardly guided, which are journalled in side plates of the carriage, said upstanding main frame part supporting a cylinder-piston assembly which engages the carriage and which displaces the carriage upwardly and downwardly.

16. Device according to claim 15, wherein the carriage comprises two downwardly converging rods which extend downwardly obliquely and which are connected at their lower ends with an actuating plate, the cylinder-piston assembly engaging said actuating plate.

17. Device according to claim 13, wherein the actuating arm of each of the two pressure frame parts is rotatable by means of a cylinder-piston assembly which is pivotally connected with the pivot arm.

18. Device according to claim 17, wherein each pivot arm is composed of two interconnected plates in substantially parallel spaced relationship.

19. A pressure frame according to claim 9 and further comprising a carriage adapted to be guided along the upstanding main frame part, the actuating arm of each of the two pressure frame parts being pivotally connected to said carriage, and means to displace said carriage upwardly and downwardly.

20. A pressure frame according to claim 19, wherein a return spring is provided for each actuating arm and engages at one end each actuating arm in the vicinity of the universal coupling, the other end of said return spring being connected to said carriage.

21. A pressure frame according to claim 20, wherein said means to displace said carriage comprises two downwardly converging rods which extend downwardly obliquely from said carriage and are connected at their lower ends with an actuating plate, and a cylinder-piston means mounted on said main frame with the piston rod thereof engaging said actuating plate.

22. A pressure frame according to claim 5, wherein said elastically deformable intermediate part comprises two strip members each being fixedly connected at one end to the end arm of one of said pressure frame parts, the other end being slidably guided with respect to the end arm of the other pressure frame part.

23. A pressure frame according to claim 3, wherein each pressure frame part is connected to an acutating arm by means of a universal coupling, said actuating arm being connected to said support means and coupled to said actuating means.

24. A pressure frame according to claim 23, wherein the actuating arm of each of the two pressure frame parts is fixedly connected to a pivot arm, which is pivotally supported by the support means and which is pivoted by the actuating means.

25. A pressure frame according to claim 23, and further comprising a carriage adapted to be guided along the upstanding main frame part for displacement upwardly and downwardly, the actuating arm of each of the two pressure frame parts being pivotally connected to said carriage.

26. A pressure frame according to claim 25, wherein a return spring engages each actuating arm in the vicinity of the universal coupling, the other end of said return spring being connected with the carriage.

27. A pressure frame according to claim 26, wherein the means are provided for displacing said carriage comprising two downwardly converging rods which extend downwardly obliquely from said carriage and which are connected at their lower ends with an actuating plate, and a cylinder-piston assembly engaging said actuating plate.

28. In a device for cutting out and transporting a silage block including a main frame which may be connected to a tractor and which is provided with an at least approximately horizontal cross-beam, which carries a plurality of parallel tines and to which an upstanding main frame part is connected which supports near its upper end an at least approximately horizontal frame member along which a cutting means may be reciprocated, the improvement in a pressure frame comprising support means adapted to be supported by the upstanding main frame part underneath said frame member, said pressure frame having a shape so as to extend near the cutting means and being comprised of a plurality of pressure frame parts which are displaceable with respect to each other, at least one elastically deformable member connecting said pressure frame parts together, actuating means which separately engage each pressure frame part, an actuating arm connected to each pressure frame part by means of a universal coupling, said actuating arm being connected to said support means and coupled with the actuating means.

29. A pressure frame according to claim 28, wherein the actuating arm of each of the pressure frame parts is fixedly connected to a pivot arm, which is pivotally supported by the support means and which is pivotable by the actuating means.

30. A pressure frame according to claim 29, wherein the actuating arm of each of the pressure frame parts is pivotally connected to a carriage which is adapted to be guided along the upstanding main frame part for upward and downward displacement.

31. A pressure frame according to claim 30, wherein a return spring engages each actuating arm in the vicinity of said universal coupling, the other end of said return spring being connected with said carriage.

* * * * *